(12) United States Patent
Rong et al.

(10) Patent No.: US 7,881,725 B2
(45) Date of Patent: Feb. 1, 2011

(54) METHOD AND APPARATUS FOR PROVIDING ADAPTIVE THRESHOLDING FOR ADJUSTMENT TO LOADING CONDITIONS

(75) Inventors: Zhigang Rong, San Diego, CA (US); Lin Ma, San Diego, CA (US); Zhouyue Pi, San Diego, CA (US)

(73) Assignee: Nokia Corporation, Espoo (FI)

( * ) Notice: Subject to any disclaimer, the term of this patent is extended or adjusted under 35 U.S.C. 154(b) by 990 days.

(21) Appl. No.: 11/480,310

(22) Filed: Jun. 30, 2006

(65) Prior Publication Data

US 2008/0004031 A1    Jan. 3, 2008

(51) Int. Cl.
*H04W 72/00* (2009.01)

(52) U.S. Cl. .............. 455/453; 455/67.11; 455/67.7; 455/450; 455/452.1; 455/452.2; 370/331; 370/468

(58) Field of Classification Search ......... 455/450–453, 455/69, 522, 561, 67.11, 67.7, 423, 446, 455/436; 370/331, 258
See application file for complete search history.

(56) References Cited

U.S. PATENT DOCUMENTS

| | | | |
|---|---|---|---|
| 6,034,971 A * | 3/2000 | Love et al. ............... 370/468 |
| 6,266,531 B1 * | 7/2001 | Zadeh et al. ............. 455/453 |
| 6,950,656 B1 * | 9/2005 | Bahk et al. .............. 455/436 |
| 7,047,312 B1 * | 5/2006 | Aweya et al. ............ 709/235 |
| 7,295,855 B1 * | 11/2007 | Larsson et al. ........... 455/522 |
| 7,792,534 B2 * | 9/2010 | Wu et al. ............... 455/452.2 |
| 2002/0183066 A1 * | 12/2002 | Pankaj ................... 455/453 |
| 2002/0193118 A1 * | 12/2002 | Jain et al. ............... 455/453 |
| 2004/0013089 A1 * | 1/2004 | Taneja et al. ............. 370/235 |
| 2004/0121808 A1 * | 6/2004 | Hen et al. ............... 455/561 |
| 2004/0152481 A1 * | 8/2004 | Georgeaux et al. ....... 455/522 |
| 2004/0203462 A1 * | 10/2004 | Lin et al. ............... 455/67.13 |
| 2006/0234714 A1 * | 10/2006 | Pollini et al. ............ 455/446 |
| 2007/0104102 A1 * | 5/2007 | Opsasnick ............... 370/230 |
| 2007/0155395 A1 * | 7/2007 | Gopalakrishnan et al. ... 455/453 |
| 2007/0177626 A1 * | 8/2007 | Kotelba ................. 370/468 |
| 2008/0062925 A1 * | 3/2008 | Mate et al. .............. 370/331 |
| 2010/0220615 A1 * | 9/2010 | Enstrom et al. ........... 370/252 |

* cited by examiner

*Primary Examiner*—Sharad Rampuria
(74) *Attorney, Agent, or Firm*—Ditthavong Mori & Steiner, P.C.

(57) ABSTRACT

An approach is provided for adaptively adjusting a threshold relating to a loading condition of a communication link. The threshold (e.g., rise over thermal (ROT) threshold) is adaptively adjusted the threshold based on an overshoot rate parameter that specifies number of times a target rate is exceeded and based on number of occurrences of an overshoot event.

34 Claims, 12 Drawing Sheets

METHOD AND APPARATUS FOR PROVIDING ADAPTIVE THRESHOLDING FOR ADJUSTMENT TO LOADING CONDITIONS

FIELD OF THE INVENTION

Embodiments of the invention relate to communications, and more particularly, to providing communication parameters in response to loading condition of a communication link.

BACKGROUND

Radio communication systems, such as cellular systems (e.g., spread spectrum systems (such as Code Division Multiple Access (CDMA) networks), or Time Division Multiple Access (TDMA) networks), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. For example, significant effort has been put forth to studying the stability of a CDMA system with respect to the loading condition on the reverse link. Improper management of the reverse link results in under-utilization of expensive network resources or system instability, thereby compromising network capacity and coverage. This task is further complicated by the fact that loading conditions continually change.

Therefore, there is a need for an approach to provide a mechanism that can adapt to the loading conditions of a communication link and operate within existing communication standards and protocols.

Some Exemplary Embodiments

These and other needs are addressed by the invention, wherein an approach is provided for adaptively adjusting a threshold (e.g., rise over thermal (ROT) threshold) related to the loading condition of a communication link.

According to one aspect of an embodiment of the invention, a method comprises setting a threshold relating to loading condition of a communication link. The method also comprises adaptively adjusting the threshold based on an overshoot rate parameter that specifies number of times a target rate is exceeded.

According to another aspect of an embodiment of the invention, an apparatus comprises a processor configured to set a threshold relating to loading condition of a communication link. The processor is further configured to adaptively adjust threshold based on an overshoot rate parameter that specifies number of times a target rate is exceeded.

According to another aspect of an embodiment of the invention, a method comprises receiving a control message including that a loading condition of a communication link is either high or not high. The control message is generated by comparing the loading condition with a threshold that is adaptively adjusted based on an overshoot rate parameter that specifies number of times a target rate is exceeded. Additionally, the method comprises adjusting a transmission rate for communication over the communication link in response to received control message.

According to another aspect of an embodiment of the invention, an apparatus comprises a processor configured to receive a control message indicating that a loading condition of a communication link is either high or not high. The control message is generated by comparing the loading condition with a threshold that is adaptively adjusted based on an overshoot rate parameter that specifies number of times a target rate is exceeded. The processor is further configured to adjust a transmission rate for communication over the communication link in response to received control message.

According to another aspect of an embodiment of the invention, a method comprises setting a rise over thermal (ROT) threshold corresponding to a reverse link of a spread spectrum communication system. The ROT threshold defines a threshold for a radio of a reverse link receive power to thermal noise level. The method also comprises adaptively adjusting the ROT threshold based on an overshoot rate parameter that specifies number of times a target is exceeded and based on number of occurrences of an overshoot event. The overshoot event indicates number of times the target rate is exceeded over a predetermined period, wherein the adjusted ROT threshold is restricted to a range of values defined by a maximum value and a minimum value.

According to yet another aspect of an embodiment of the invention, a system comprises a processor configured to set a rise over thermal (ROT) threshold corresponding to a reverse link of a spread spectrum communication system. The ROT threshold defines a threshold for a ratio of a reverse link receive power to thermal noise level. The processor is further configured to adaptively adjust the ROT threshold based on an overshoot rate parameter that specifies number of times a target rate is exceeded and based on number of occurrences of an overshoot event. The overshoot event indicates number of times the target rate is exceed over a predetermined period, wherein the adjusted ROT threshold is restricted to a range of values defined by a maximum value and minimum value.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative, and not as restrictive.

BRIEF DESCRIPTION OF THE DRAWINGS

The invention is illustrated by way of example, and not by way of limitation, in the figures of the accompanying drawings in which like reference numerals refer to similar elements and in which.

DESCRIPTION OF THE PREFERRED EMBODIMENT

An apparatus, method, and software for adaptively adjusting a threshold relating to loading condition of a communication link are disclosed. In the following description, for the purposes of explanation, numerous specific details are set forth in order to provide a thorough understanding of the invention. It is apparent, however, to one skilled in the art that the invention may be practiced without these specific details or with an equivalent arrangement. In other instances, well-known structures and devices are shown in block diagram form in order to avoid unnecessarily obscuring the embodiments of the invention.

Although the invention, according to various embodiments, is discussed with respect to a radio communication network (such as a cellular system), it is recognized by one of ordinary skill in the art that the embodiments of the invention have applicability to any type of communication systems, including wired systems. Additionally, the various embodiments of the invention are explained using rise over thermal (ROT) control, it is recognized by one of ordinary skill in the art that other indicia of loading condition can be utilized.

Figure 1:
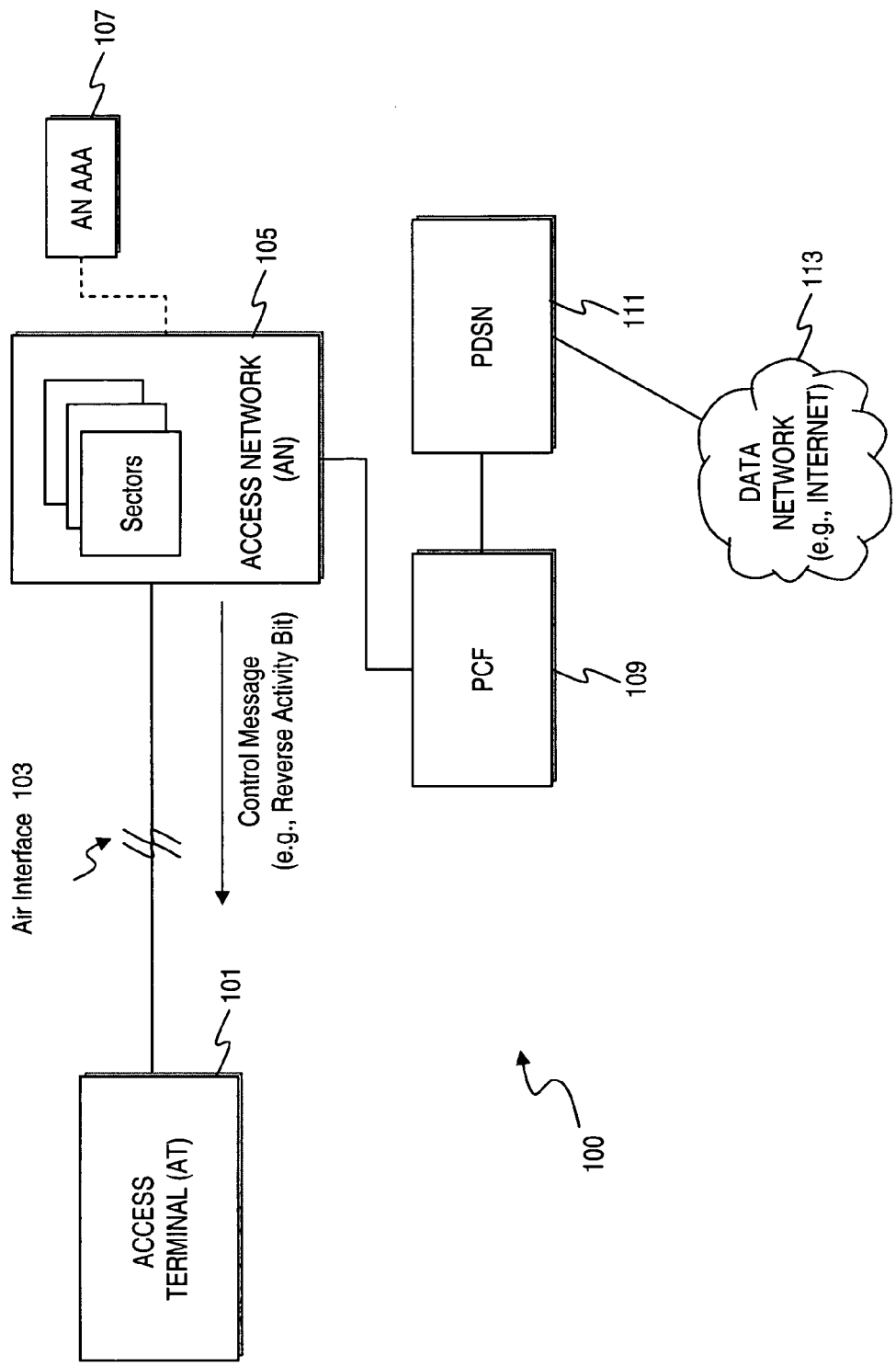
FIG. 1 is a diagram of the architecture of a wireless system configured to adaptively adjust a threshold relating to loading condition of a communication link, in accordance with an embodiment of the invention.

FIG. 1 is a diagram of the architecture of a wireless system configured to adaptively adjust a threshold relating to loading condition of a communication link, in accordance with an embodiment of the invention. For the purposes of illustration, the adaptive threshold adjustment mechanism, according to one embodiment, is explained in the context of a radio communication system 100 (e.g., spread spectrum cellular system), whereby an access terminal (AT) 101 communicates over an air interface 103 with an access network (AN) 105 (or base station). The terminal 101, in one embodiment, can be a mobile. As used herein, the terms "mobile," "mobile station," "mobile device" or "unit" are synonymous. Although the various embodiments of the invention describe the mobile as a handset, it is contemplated that any mobile device with voice functionality can be used (e.g., a combined Personal Digital Assistant (PDA) and cellular phone). The AT 101 is a device that provides data connectivity as well as telephony services to a user. For example, the AT 101 can be connected to a computing system, such as a personal computer, a personal digital assistant, and etc. or a data service enabled cellular handset.

The system 100, according to one embodiment, has an architecture according to a Third Generation Partnership Project 2 (3GPP2) cdma2000 1×EV-DO (Evolution-Data Only) Revision A system. In 1×EV-DO Rev. A system, the AN 105 (or base station) measures a rise over thermal (ROT) value and compares the value to a threshold (i.e., ROT threshold). Rise over thermal parameter is a ratio of the reverse link received power to the thermal noise level at the base station or AN 105, and provides an indication of the loading condition on the reverse link in a system. To maintain the stability of the system 100, it is generally required that the ROT overshoot rate (i.e., the percentage of time the ROT exceeds a specified target, e.g., 7 dB) to be lower than or equal to a certain percentage, e.g., 1%. Therefore, an effective and efficient ROT control mechanism is essential to the operation of the system 100. The AN 105 generates a control message to indicate whether the loading condition, as specified by the ROT, is high or not high; this determination is made based on a predetermined threshold—i.e., ROT threshold. The AN 105 sends the control message to the AT 101, which adjusts the transmission rate and/or power accordingly.

Traditionally, a fixed ROT threshold has been employed. However, using a fixed ROT threshold has the drawback that when it is set to an unnecessarily low value, the reverse link system resource is under-utilized, and when it is set to a too high value, the system can become unstable as the ROT overshoot rate could exceed the target (e.g., 1%). In addition, without an accurate ROT control mechanism, some sectors in the system 100 may experience a large ROT overshoot rate while others may have a ROT overshoot rate much lower than the target. As a result, system capacity and coverage are provided inefficiently.

In recognition of the above drawbacks, an adaptive thresholding mechanism is utilized, as more fully described below with respect to FIGS. 2-5.

As seen in FIG. 1, the AN 105 is a network equipment or network element that provides data connectivity between a packet switched data network, such as the global Internet 113 and the AT 101. In addition, the AN 105 communicates with an AN-AAA (Authentication, Authorization and Accounting entity) 107, which provides terminal authentication and authorization functions for the AN 105. According to various embodiments, the AN 105 includes a High Data Rate (HDR) base station to support high data rate services. It should be understood that the base station provides the RF interface (carrier(s)) between an access terminal and the network via one or more transceivers. The HDR base station provides a separate data only (DO) carrier for HDR applications for each sector (or cell) served by the HDR base station. A separate base station or carrier (not shown) provides the voice carrier(s) for voice applications. A HDR access terminal may be a DO access terminal or a dual mode mobile terminal capable of utilizing both voice services and data services. To engage in a data session, the HDR access terminal connects to a DO carrier to use the DO high-speed data service. The data session is controlled by a Packet Data Service Node (PDSN), which routes all data packets between the HDR access terminal and the Internet. The PDSN 111 has a direct connection to a Packet Control Function (PCF) 109, which interfaces with a Base Station Controller (BSC) of the HDR base station. The BSC (not shown) is responsible for operation, maintenance and administration of the HDR base station, speech coding, rate adaptation and handling of the radio resources. It should be understood that the BSC may be a separate node or may be co-located with one or more HDR base stations.

Each HDR base station can serve multiple (e.g., three) sectors (or cells). However, it should be understood that each HDR base station may serve only a single cell (referred to as an omni cell). It should also be understood that the network may include multiple HDR base stations, each serving one or more sectors, with HDR mobile terminals being capable of handing off between sectors of the same HDR base station or sectors of different HDR base stations. For each sector (or cell), the HDR base station further employs a single shared, time division multiplexed (TDM) forward link, where only a single HDR mobile terminal is served at any instance. The forward link throughput rate is shared by all HDR mobile terminals. A HDR access terminal selects a serving sector (or cell) of the HDR base station by pointing its Data Rate Control (DRC) towards the sector and requesting a forward data rate according to the channel conditions (i.e., based on the Carrier to Interference (C/I) ratio of the channel).

As shown, the AN 105 communicates with a Packet Data Service Node (PDSN) 111 via a Packet Control Function (PCF) 109. Either the AN 105 or the PCF 109 provides a SC/MM (Session Control and Mobility Management) function, which among other functions includes storing of HRPD session related information, performing the terminal authentication procedure to determine whether an AT 101 should be authenticated when the AT 101 is accessing the radio network, and managing the location of the AT 101. The PCF 109 is further described in 3GPP2 A.S0001-A v2.0, entitled "3GPP2 Access Network Interfaces Interoperability Specification," June 2001, which is incorporated herein by reference in its entirety. Also, a more detailed description of the HRPD is provided in TSG-C.S0024-IS-856, entitled "cdma2000 High Rate Packet Data Air Interface Specification," which is incorporated herein by reference in its entirety.

Both the cdma2000 1×EV-DV (Evolution-Data and Voice) and 1×EV-DO (Evolution-Data Optimized) air interface standards specify a packet data channel for use in transporting packets of data over the air interface (e.g., interface 103) on the forward link and the reverse link. The wireless communication system (e.g., system 100) may be designed to provide various types of services. These services may include point-to-point services, or dedicated services such as voice and packet data, whereby data is transmitted from a transmission source (e.g., a base station) to a specific recipient terminal. Such services may also include point-to-multipoint (i.e., multicast) services, or broadcast services, whereby data is transmitted from a transmission source to a number of recipient terminals.

In the multiple-access wireless communication system 100, communications between users are conducted through one or more AT(s) 101 and a user (access terminal) on one wireless station communicates to a second user on a second wireless station by conveying information signal on a reverse link to a base station. The AN 105 receives the information signal and conveys the information signal on a forward link to the AT 101. The AN 105 then conveys the information signal on a forward link to the AT 101. The forward link refers to transmissions from an AN 105 to the AT 101, and the reverse link refers to transmissions from the AT 101 to the AN 105. The AN 105 receives the data from the first user on the wireless station on a reverse link, and routes the data through a public switched telephone network (PSTN) to the second user on a landline station. In many communication systems, e.g., IS-95, Wideband CDMA (WCDMA), and IS-2000, the forward link and the reverse link are allocated separate frequencies.

Figure 2:
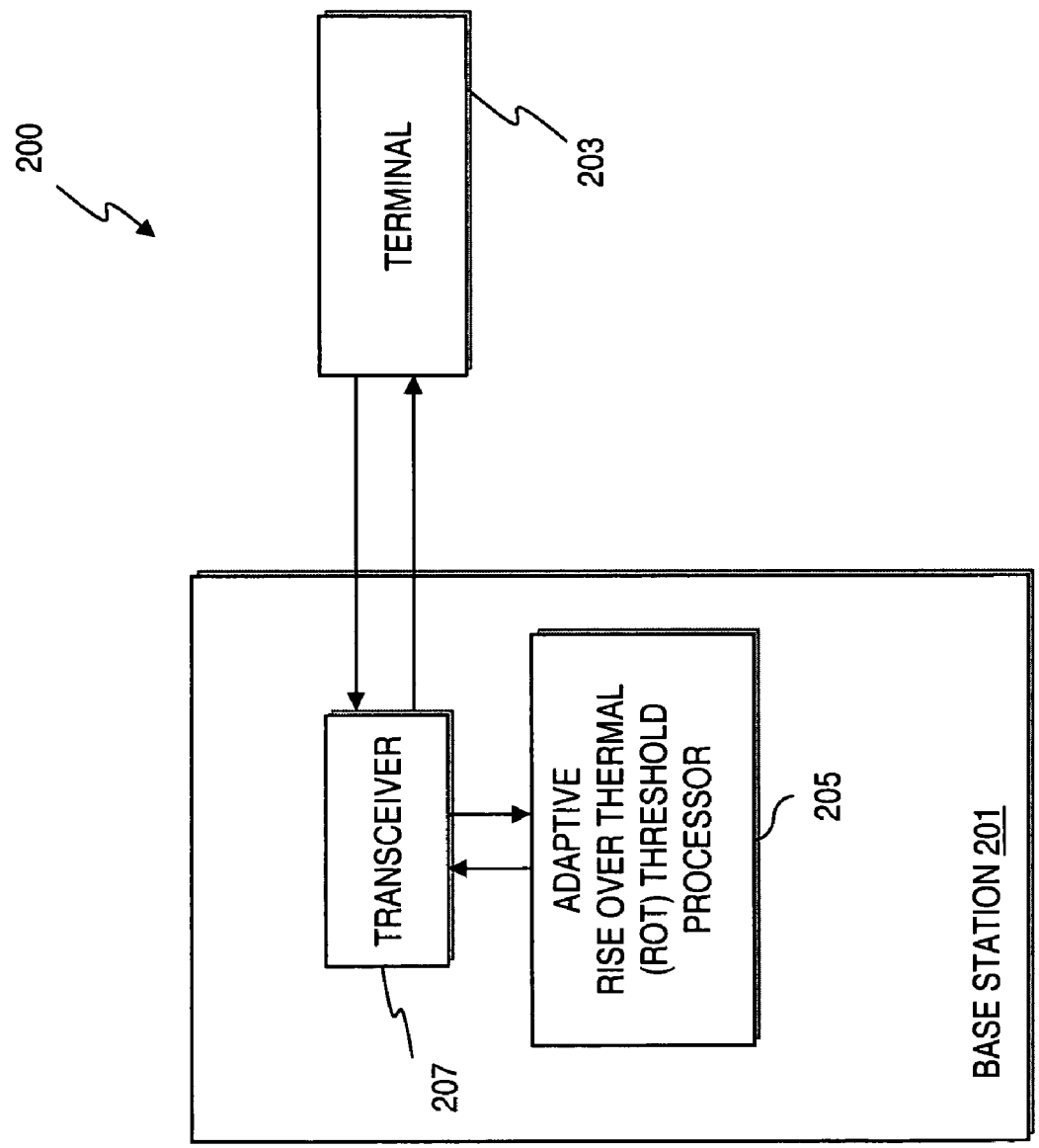
FIG. 2 is a diagram of an exemplary base transceiver station (BTS) operating in the system of FIG. 1 to provide rise over thermal (ROT) control, in accordance with an embodiment of the invention.

FIG. 2 is a diagram of an exemplary base transceiver station (BTS) operating in the system of FIG. 1 to provide rise over thermal (ROT) control, in accordance with an embodiment of the invention. In this example, a network 200 provides communication between a base station (BS) 201 and a terminal 203. The base station 201 includes an adaptive ROT threshold processor 205 for implementing the ROT control mechanism; the base station 201 also includes a transceiver 207 coupled to an antenna (not shown).

In an exemplary embodiment, the adaptive ROT threshold processor 205 can determine through, for instance measurement, the ROT associated with the reverse communication link 209. If the measured ROT is larger than a specified threshold, the base station 201 sends a Reverse Activity Bit (RAB) of "Busy" value to the terminal 203, indicating that the loading of the reverse link is high. Otherwise, the base station 201 sends a RAB of "Not Busy" value to the terminal 203, indicating that the loading of the reverse link is not high. Based on the received RABs, the terminal 203 can adjust, in one embodiment, the reverse traffic channel transmission data rates and Traffic to Pilot Channel Power Ratio (T2P) according to the Reverse Traffic Channel MAC (RTCMAC) protocol. That is, in response to the reverse activity bit, the terminal 203 is instructed to decrease the data rate if the ROT at the base station 201 exceeds the ROT threshold.

Figure 3:
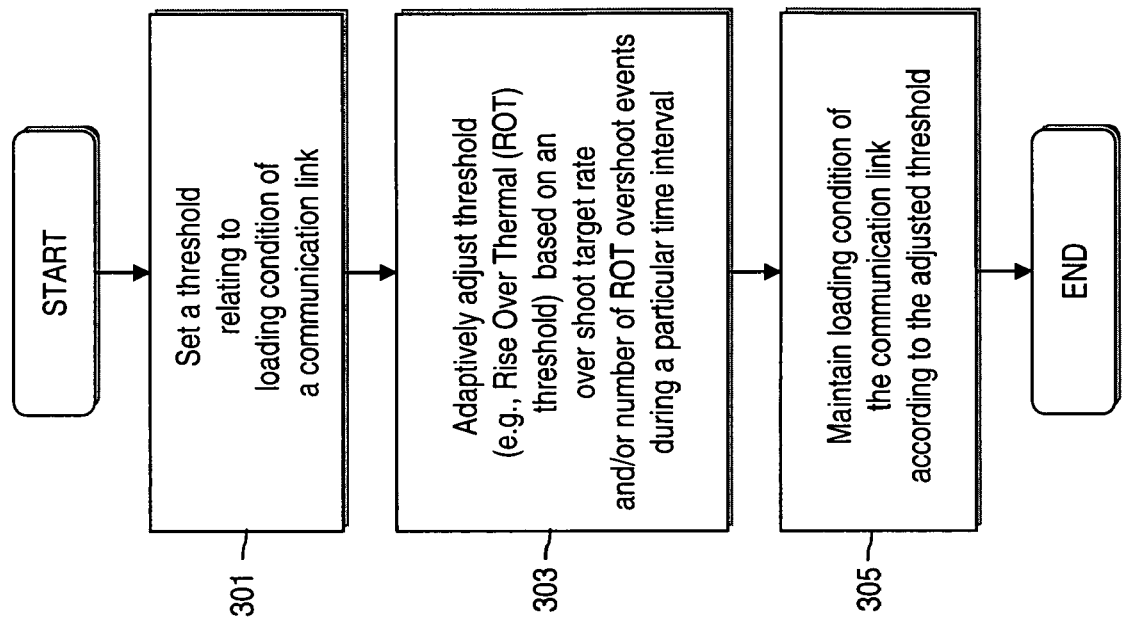
FIG. 3 is a flowchart of a process for adaptively adjusting a threshold relating to loading condition of a communication link, according to an embodiment of the invention.

The adaptive ROT threshold processor 209 can dynamically increase or decrease the ROT threshold in response to the determined value for the ROT parameter, as next explained with respect to FIG. 3.

FIG. 3 is a flowchart of a process for adaptively adjusting a threshold relating to loading condition of a communication link, according to an embodiment of the invention. In step 301, the processor 205 sets a threshold (e.g., ROT threshold) relating to loading condition of communication link. The processor 205, per step 303, can adaptively adjust the threshold (e.g., ROT threshold) based on, in an exemplary embodiment, on an overshoot rate parameter that specifies the number of times a target rate is exceeded and/or number of occurrences of an overshoot event during a certain time interval. In step 305, the loading condition of the communication link is maintained according to the adjusted threshold. By way of example, the processor 205 can instruct the terminal 203 to adjust for a high loading condition by transmitting a control message, such as reverse activity bit (RAB), to the terminal 203.

Figure 4:
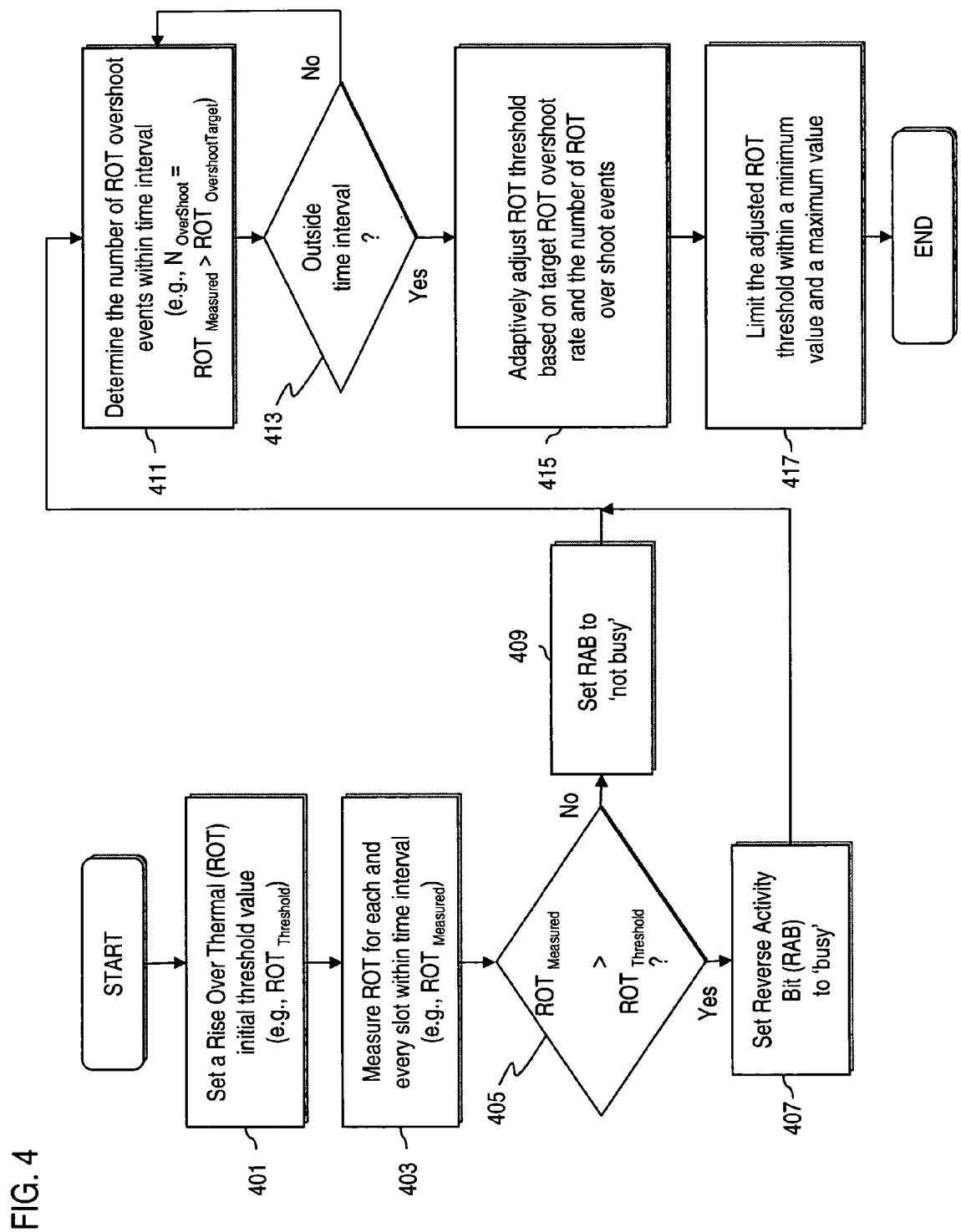
FIG. 4 is a flowchart of a process for ROT control, according to an embodiment of the invention.

FIG. 4 is a flowchart of a process for ROT control, according to an embodiment of the invention. In this example, a ROT initial threshold ($ROT_{Threshold}$), as in step 401, to an initial value, e.g., 5 dB. Table 1, below, enumerates the descriptions of the parameters associated with the adaptive threshold adjustment mechanism.

TABLE 1

| PARAMETER | DESCRIPTION |
| --- | --- |
| $ROT_{Threshold}$ | Rise over Thermal Threshold that is used to set the RAB |
| $ROT_{ThresholdMin}$ | Minimum ROT Threshold |
| $ROT_{ThresholdMax}$ | Maximum ROT Threshold |
| $ROT_{Measured}$ | Measured ROT |
| $ROT_{OverShootTarget}$ | Rise over Thermal Overshoot Target (e.g., 7 dB) |
| $P_{OverShootTarget}$ | Target ROT Overshoot Rate (e.g., percentage of the time that Rise over Thermal exceeds $ROT_{OverShootTarget}$, 1%) |
| $T_{Adjust}$ | Time interval (in slots) between two consecutive adjustments of the $ROT_{Threshold}$ |
| $N_{OverShoot}$ | Number of time slots when ROT overshoot occurs within the time interval $T_{Adjust}$, e.g., the number of slots with $ROT_{Measured} > ROT_{OverShootTarget}$ |
| $\Delta_{Up}$ | Up step size when increasing the $ROT_{Threshold}$ |
| $\Delta_{Down}$ | Down step size when decreasing the $ROT_{Threshold}$ |

During the time interval $T_{Adjust}$, the base station 201 measures the ROT (i.e., $ROT_{Measured}$) for each and every slot, per step 403. In step 405, it is determined whether $ROT_{Measured}$ is greater that the $ROT_{Threshold}$; if so, the base station 201 sets the RAB to "Busy" (step 407). Otherwise, the RAB is set, as in step 409, to "Not Busy."

The base station 201, in step 411, tracks the number of ROT overshoot events; that is, the number of slots, $N_{OverShoot}$, in which $ROT_{Measured}$ is greater than the $ROT_{OverShootTarget}$ within the time interval, $T_{Adjust}$.

At the end of the time interval $T_{Adjust}$, as determined in step 413, the base station 201 adaptively adjusts, per step 415, the $ROT_{Threshold}$ as follows:

$$ROT_{Threshold}(n) = ROT_{Threshold}(n-1) - N_{OverShoot} \cdot \Delta_{Down} + (T_{Adjust} - N_{OverShoot}) \cdot \Delta_{Up}$$

Further, the base station 201 can limit the adjusted $ROT_{Threshold}$ to be within a certain as defined by minimum and maximum values for the threshold, as in step 417:

$$ROT_{Threshold}(n) = \begin{cases} ROT_{ThresholdMax}, & \text{if } ROT_{Threshold}(n) > ROT_{ThresholdMax} \\ ROT_{Threshold}(n), & \text{if } ROT_{ThresholdMin} \leq ROT_{Threshold}(n) \leq ROT_{ThresholdMax} \\ ROT_{ThresholdMin}, & \text{if } ROT_{Threshold}(n) < ROT_{ThresholdMin} \end{cases}$$

In other words, within the time interval, each slot with an ROT overshoot causes the $ROT_{Threshold}$ to be reduced by an amount of $\Delta_{Down}$, and each slot without an ROT overshoot causes the $ROT_{Threshold}$ to be increased by an amount of $\Delta_{Up}$. The $ROT_{Threshold}$ is limited by the minimum and the maximum value, $ROT_{ThresholdMin}$, and $ROT_{ThresholdMax}$, respectively, to prevent the threshold from significant deviation.

The reason behind the above adjustment is that when an ROT overshoot event occurs, it implies the reverse link loading is high, and the base station 201 should lower the ROT threshold such that a "Busy" RAB can be more easily triggered. And when the ROT overshoot event does not occur, the base station 201 should increase the ROT threshold such that a "Not Busy" RAB can be more easily triggered. To achieve an ROT overshoot rate that is very close to the target ROT overshoot rate, $P_{OverShootTarget}$, the up and down step size for the $ROT_{Threshold}$ is provided, according to one embodiment, with the following relationship:

$$\Delta_{Down} = \left( \frac{1}{P_{OverShootTarget}} - 1 \right) \cdot \Delta_{Up}$$

It is noted that in order to provide sufficient time for the terminal 203 to respond to the control message (e.g., RAB), the update rate of the ROT threshold should be lower than the update rate of the data rate of the terminal 203. For example, in 1×EV-DO Rev. A, the terminal 203 can adjust its reverse traffic channel data rate every one sub-frame (e.g., 4 slots), therefore, the $ROT_{Threshold}$ update time interval $T_{Adjust}$ should be at least longer than the sub-frame duration.

Figure 5:
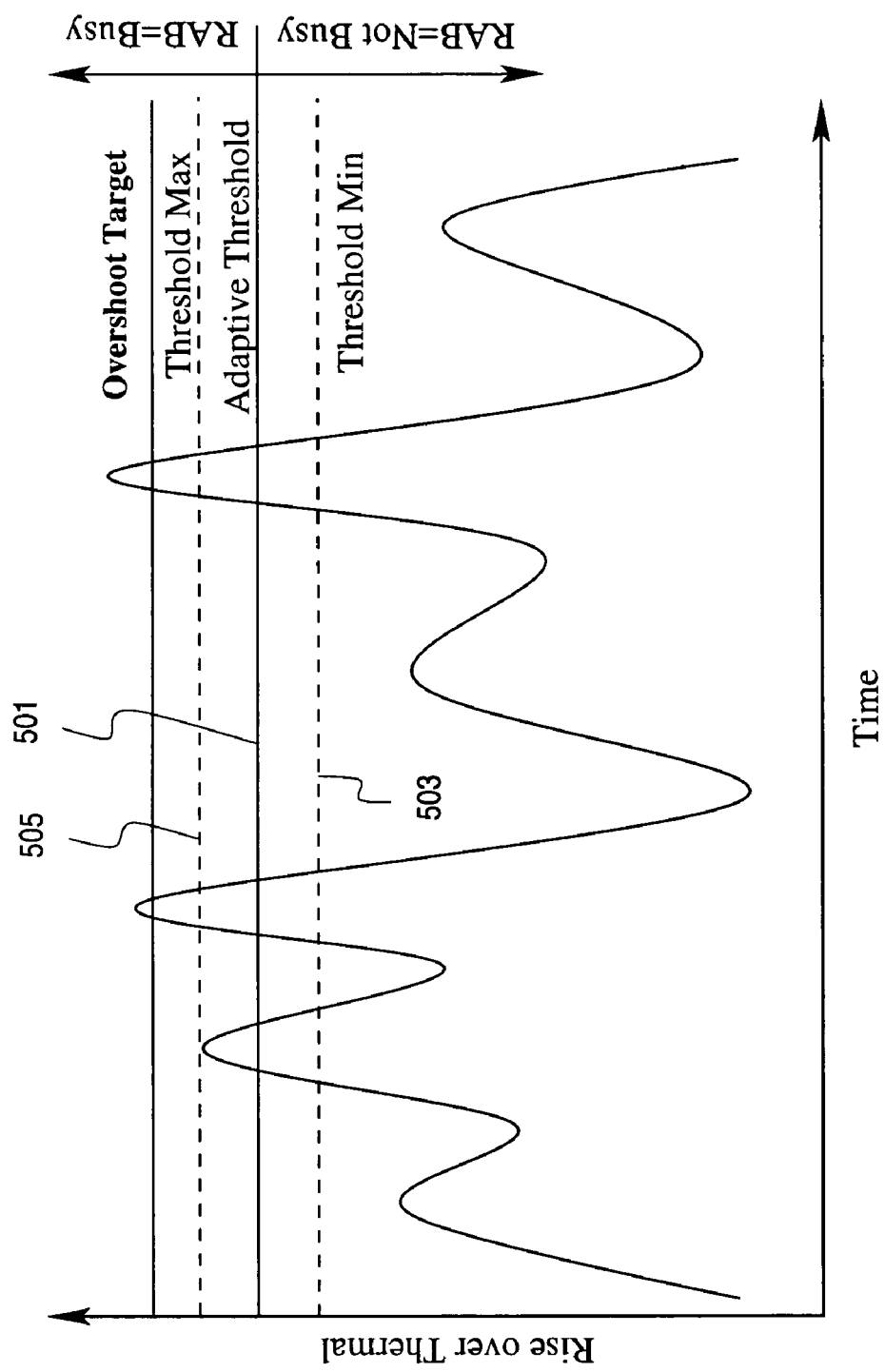
FIG. 5 is a graph illustrating an adaptive ROT threshold mechanism, according to one embodiment of the invention.

FIG. 5 shows a graph of the relationships among the following parameters: an adaptive threshold 501, a minimum threshold 503, a maximum threshold 505, and an overshoot target 507. As seen in the graph, the RAB is set to "not busy" below the adaptive threshold 501 and to "busy" above the threshold 501.

Figure 6:
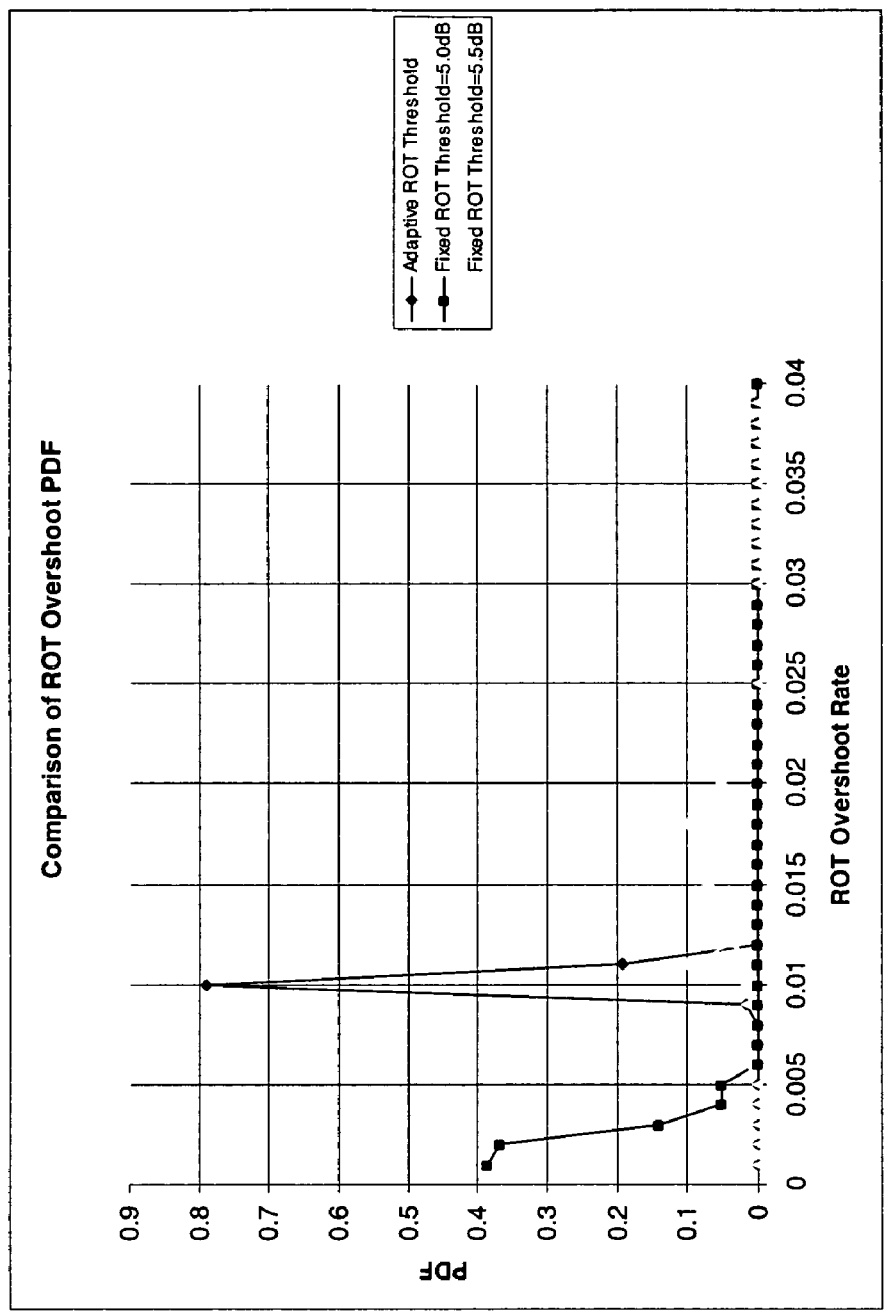
FIGS. 6-7 are graphs of simulation results of the adaptive ROT threshold adjustment mechanism of FIGS. 3 and 4.
Figure 7:
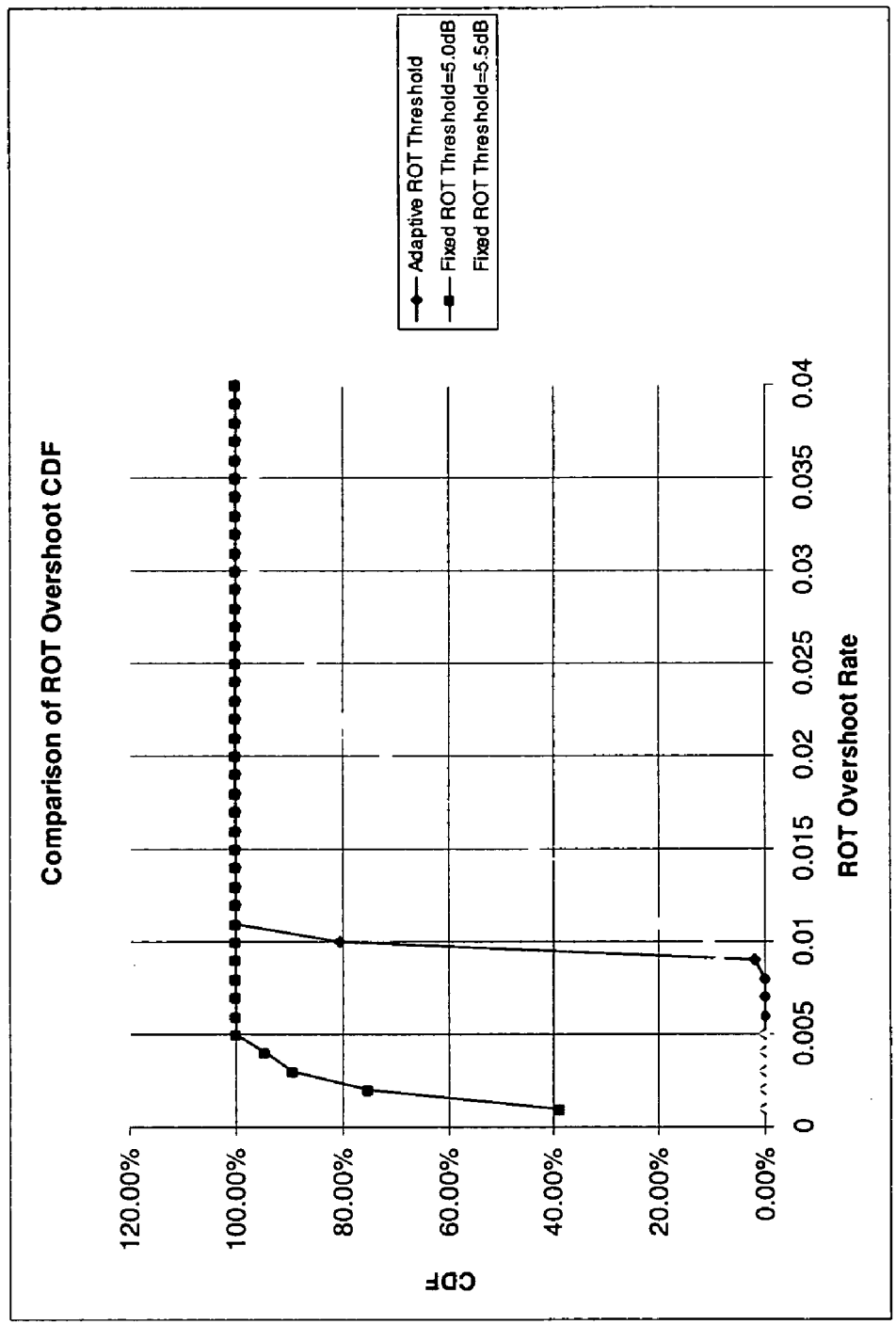

FIGS. 6-7 are graphs of simulation results of the adaptive ROT threshold adjustment mechanism of FIGS. 3 and 4. The simulations follow, for example, the methodology specified in 3GPP2 C.R1002-0, entitled "cdma2000 Evaluation Methodology," December 2004, which is incorporated herein by reference in its entirety. For these simulations, the communication system included 19 cells with 57 sectors, with each sector having 16 ATs with full buffer traffic. Also, $T_{Adjust}$ was set to 16 slots, and $\Delta_{Down}$ and $\Delta_{Up}$ is set to 0.01 and 0.01/99, respectively. FIGS. 3 and 4, respectively, show the pdf and CDF of ROT overshoot rate in which the adaptive ROT threshold and the fixed ROT threshold are utilized. As evident from the figures, with the adaptive ROT threshold adjustment, the ROT overshoot rate is well controlled at the 1% target, while with the fixed ROT threshold, the ROT overshoot rate is either well below the target (e.g., with 5.0 dB threshold) or widely exceeds the target (e.g., with the 5.5 dB threshold).

Table 2 describes the sector throughput with adaptive ROT threshold control and with fixed ROT threshold.

TABLE 2

| | Adaptive ROT Threshold Control | Fixed ROT Threshold of 5.0 dB |
|---|---|---|
| Sector Throughput (kbps/sector) | 428 | 407 |

The above simulation results show that the adaptive threshold adjustment mechanism can provide greater efficiencies in the use of system resources, and permit good control of the ROT overshoot rate.

One of ordinary skill in the art would recognize that the processes for providing adaptive threshold adjustment and loading condition control may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIGS. 2-4.

Figure 8:
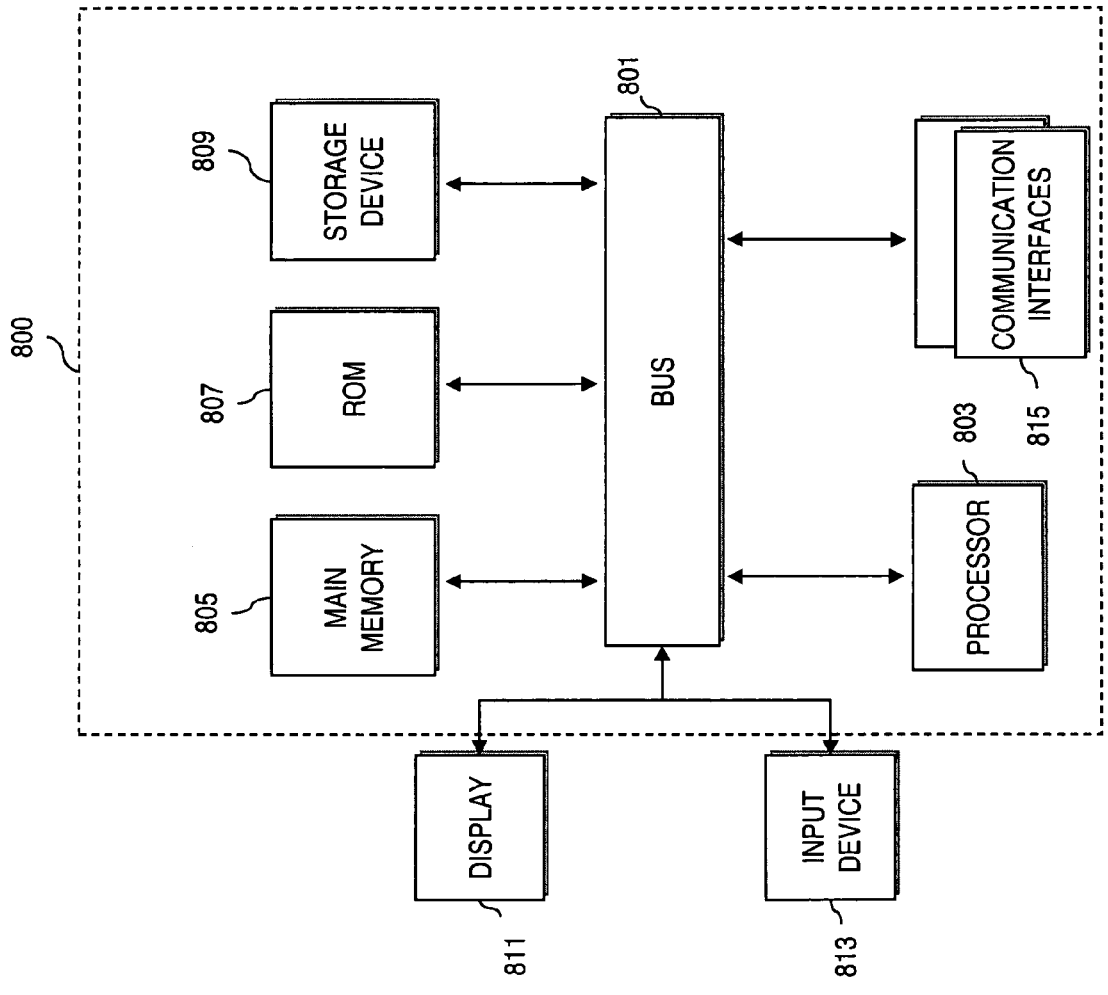
FIG. 8 is an exemplary hardware upon which an embodiment according to the invention can be implemented.

FIG. 8 illustrates exemplary hardware upon which various embodiments of the invention can be implemented. A computing system 800 includes a bus 801 or other communication mechanism for communicating information and a processor 803 coupled to the bus 801 for processing information. The computing system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computing system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computing system 800 may be coupled via the bus 801 to a display 811, such as a liquid crystal display, or active matrix display, for displaying information to a user. An input device 813, such as a keyboard including alphanumeric and other keys, may be coupled to the bus 801 for communicating information and command selections to the processor 803. The input device 813 can include a cursor control, such as a mouse, a trackball, or cursor direction keys, for communicating direction information and command selections to the processor 803 and for controlling cursor movement on the display 811.

According to various embodiments of the invention, the processes described herein can be provided by the computing system 800 in response to the processor 803 executing an arrangement of instructions contained in main memory 805.

Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 800 also includes at least one communication interface 815 coupled to bus 801. The communication interface 815 provides a two-way data communication coupling to a network link (not shown). The communication interface 815 sends and receives electrical, electromagnetic, or optical signals that carry digital data streams representing various types of information. Further, the communication interface 815 can include peripheral interface devices, such as a Universal Serial Bus (USB) interface, a PCMCIA (Personal Computer Memory Card International Association) interface, etc.

The processor 803 may execute the transmitted code while being received and/or store the code in the storage device 809, or other non-volatile storage for later execution. In this manner, the computing system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9A:
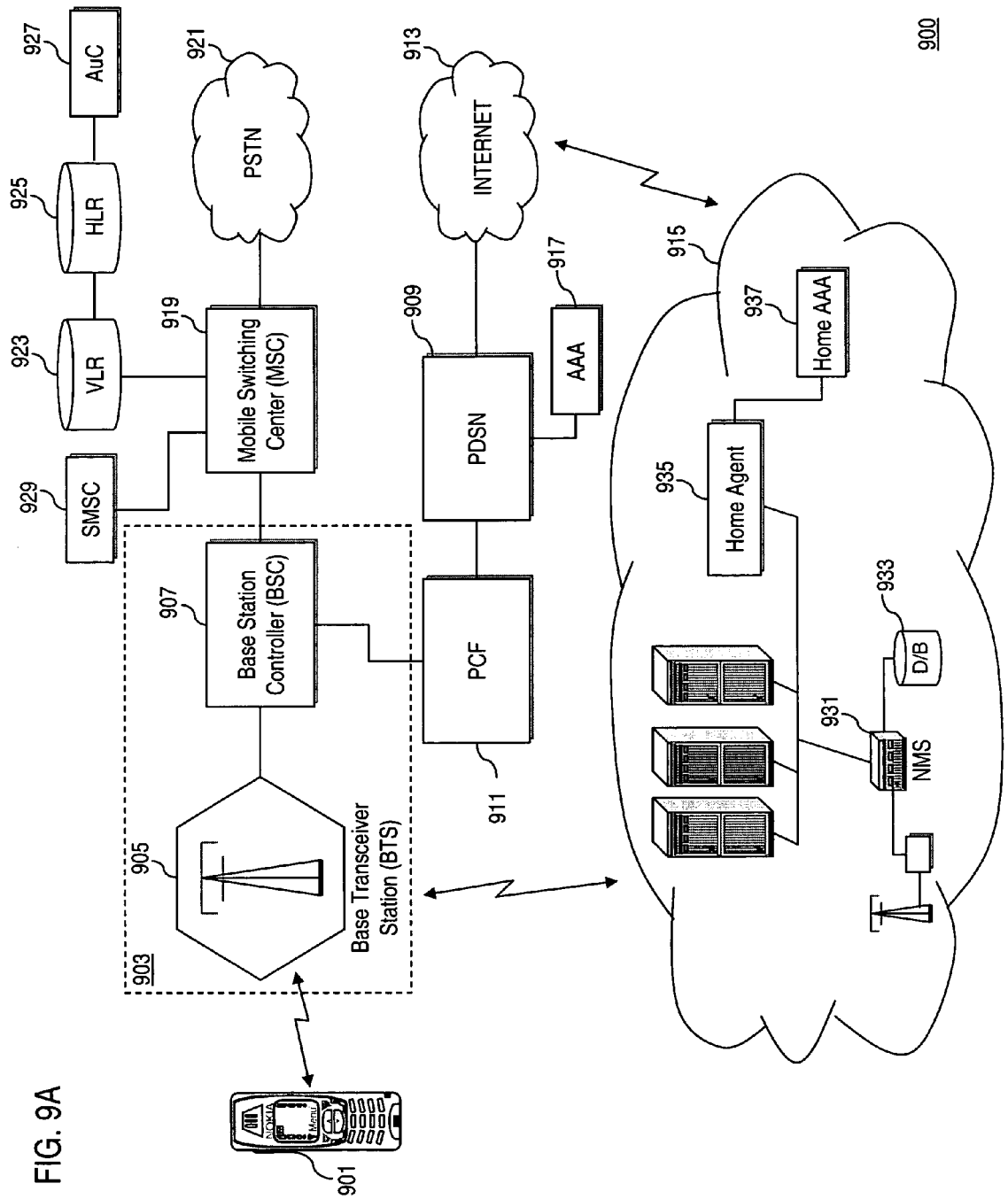
FIGS. 9A and 9B are diagrams of different cellular mobile phone systems capable of supporting various embodiments of the invention.
Figure 9B:
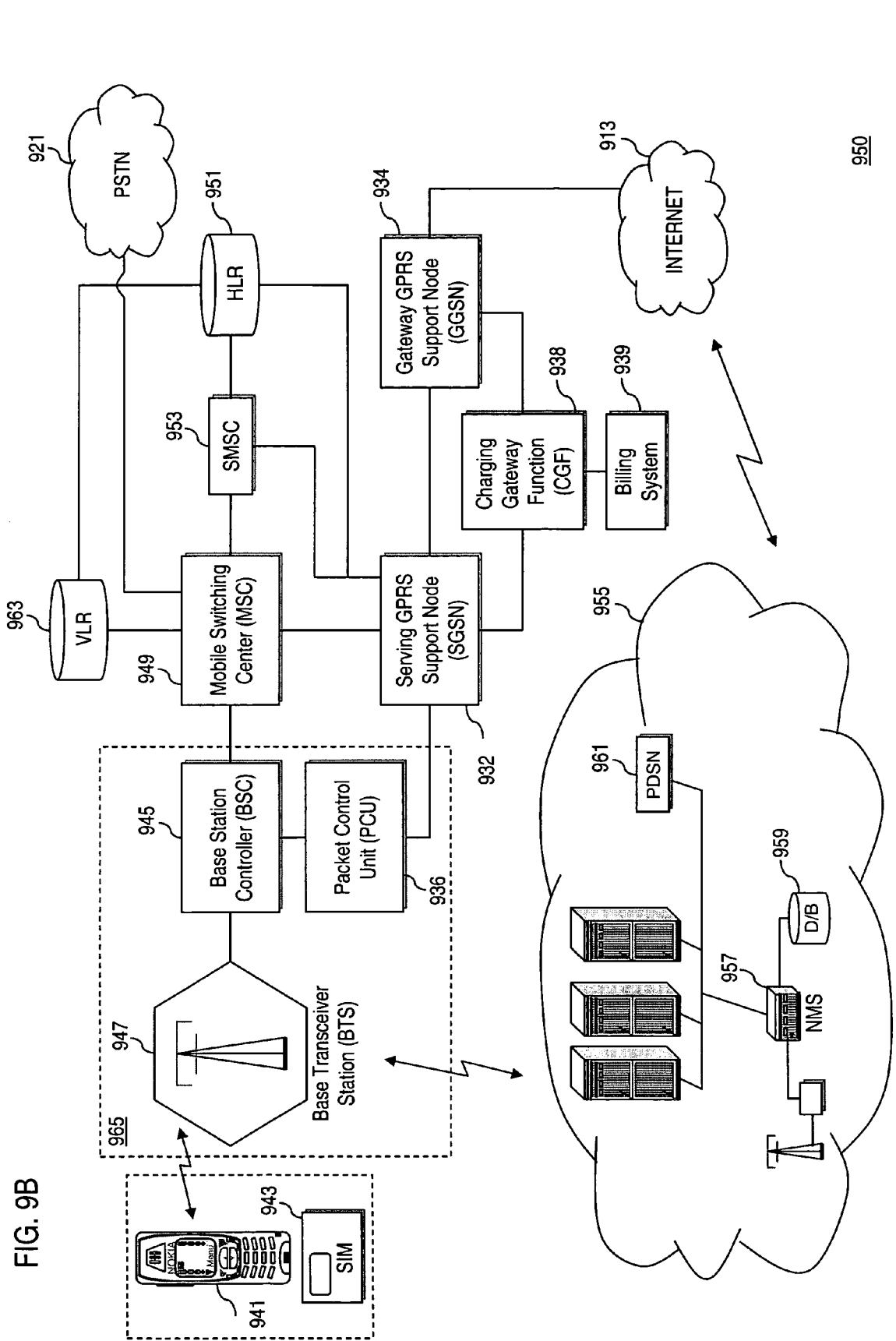

FIGS. 9A and 9B are diagrams of different cellular mobile phone systems capable of supporting various embodiments of the invention. FIGS. 9A and 9B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 900 includes mobile stations 901 (e.g., handsets, terminals, stations, units, devices, or any type of interface to the user (such as "wearable" circuitry, etc.)) in communication with a Base Station Subsystem (BSS) 903. According to one embodiment of the invention, the radio network supports Third Generation (3G) services as defined by the International Telecommunications Union (ITU) for International Mobile Telecommunications 2000 (IMT-2000).

In this example, the BSS 903 includes a Base Transceiver Station (BTS) 905 and Base Station Controller (BSC) 907. Although a single BTS is shown, it is recognized that multiple BTSs are typically connected to the BSC through, for example, point-to-point links. Each BSS 903 is linked to a Packet Data Serving Node (PDSN) 909 through a transmission control entity, or a Packet Control Function (PCF) 911. Since the PDSN 909 serves as a gateway to external networks, e.g., the Internet 913 or other private consumer networks 915, the PDSN 909 can include an Access, Authorization and Accounting system (AAA) 917 to securely determine the identity and privileges of a user and to track each user's activities. The network 915 comprises a Network Management System (NMS) 931 linked to one or more databases 933 that are accessed through a Home Agent (HA) 935 secured by a Home AAA 937.

Although a single BSS 903 is shown, it is recognized that multiple BSSs 903 are typically connected to a Mobile Switching Center (MSC) 919. The MSC 919 provides connectivity to a circuit-switched telephone network, such as the Public Switched Telephone Network (PSTN) 921. Similarly, it is also recognized that the MSC 919 may be connected to other MSCs 919 on the same network 900 and/or to other radio networks. The MSC 919 is generally collocated with a Visitor Location Register (VLR) 923 database that holds temporary information about active subscribers to that MSC 919. The data within the VLR 923 database is to a large extent a copy of the Home Location Register (HLR) 925 database, which stores detailed subscriber service subscription information. In some implementations, the HLR 925 and VLR 923 are the same physical database; however, the HLR 925 can be located at a remote location accessed through, for example, a Signaling System Number 7 (SS7) network. An Authentication Center (AuC) 927 containing subscriber-specific authentication data, such as a secret authentication key, is associated with the HLR 925 for authenticating users. Furthermore, the MSC 919 is connected to a Short Message Service Center (SMSC) 929 that stores and forwards short messages to and from the radio network 900.

During typical operation of the cellular telephone system, BTSs 905 receive and demodulate sets of reverse-link signals from sets of mobile units 901 conducting telephone calls or other communications. Each reverse-link signal received by a given BTS 905 is processed within that station. The resulting data is forwarded to the BSC 907. The BSC 907 provides call resource allocation and mobility management functionality including the orchestration of soft handoffs between BTSs 905. The BSC 907 also routes the received data to the MSC 919, which in turn provides additional routing and/or switching for interface with the PSTN 921. The MSC 919 is also responsible for call setup, call termination, management of inter-MSC handover and supplementary services, and collecting, charging and accounting information. Similarly, the radio network 900 sends forward-link messages. The PSTN 921 interfaces with the MSC 919. The MSC 919 additionally interfaces with the BSC 907, which in turn communicates with the BTSs 905, which modulate and transmit sets of forward-link signals to the sets of mobile units 901.

As shown in FIG. 9B, the two key elements of the General Packet Radio Service (GPRS) infrastructure 950 are the Serving GPRS Supporting Node (SGSN) 932 and the Gateway GPRS Support Node (GGSN) 934. In addition, the GPRS infrastructure includes a Packet Control Unit PCU (936) and a Charging Gateway Function (CGF) 938 linked to a Billing System 939. A GPRS the Mobile Station (MS) 941 employs a Subscriber Identity Module (SIM) 943.

The PCU 936 is a logical network element responsible for GPRS-related functions such as air interface access control, packet scheduling on the air interface, and packet assembly and re-assembly. Generally the PCU 936 is physically integrated with the BSC 945; however, it can be collocated with a BTS 747 or a SGSN 932. The SGSN 932 provides equivalent functions as the MSC 949 including mobility management, security, and access control functions but in the packet-switched domain. Furthermore, the SGSN 932 has connectivity with the PCU 936 through, for example, a Fame Relay-based interface using the BSS GPRS protocol (BSSGP). Although only one SGSN is shown, it is recognized that that multiple SGSNs 931 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 945, any given BSC 945 generally interfaces with one SGSN 932. Also, the SGSN 932 is optionally connected with the HLR 951 through an SS7-based interface using GPRS enhanced Mobile Application Part (MAP) or with the MSC 949 through an SS7-based interface using Signaling Connection Control Part (SCCP). The SGSN/HLR interface allows the SGSN 932 to provide location updates to the HLR 951 and to retrieve GPRS-related subscription information within the SGSN service area. The SGSN/MSC interface enables coordination between circuit-switched services and packet data services such as paging a subscriber for a voice call. Finally, the SGSN 932 interfaces with a SMSC 953 to enable short messaging functionality over the network 950.

The GGSN 934 is the gateway to external packet data networks, such as the Internet 913 or other private customer networks 955. The network 955 comprises a Network Management System (NMS) 957 linked to one or more databases 959 accessed through a PDSN 961. The GGSN 934 assigns Internet Protocol (IP) addresses and can also authenticate users acting as a Remote Authentication Dial-In User Service host. Firewalls located at the GGSN 934 also perform a firewall function to restrict unauthorized traffic. Although only one GGSN 934 is shown, it is recognized that a given SGSN 932 may interface with one or more GGSNs 933 to allow user data to be tunneled between the two entities as well as to and from the network 950. When external data networks initialize sessions over the GPRS network 950, the GGSN 934 queries the HLR 951 for the SGSN 932 currently serving a MS 941.

The BTS 947 and BSC 945 manage the radio interface, including controlling which Mobile Station (MS) 941 has access to the radio channel at what time. These elements essentially relay messages between the MS 941 and SGSN 932. The SGSN 932 manages communications with an MS 941, sending and receiving data and keeping track of its location. The SGSN 932 also registers the MS 941, authenticates the MS 941, and encrypts data sent to the MS 941.

Figure 10:
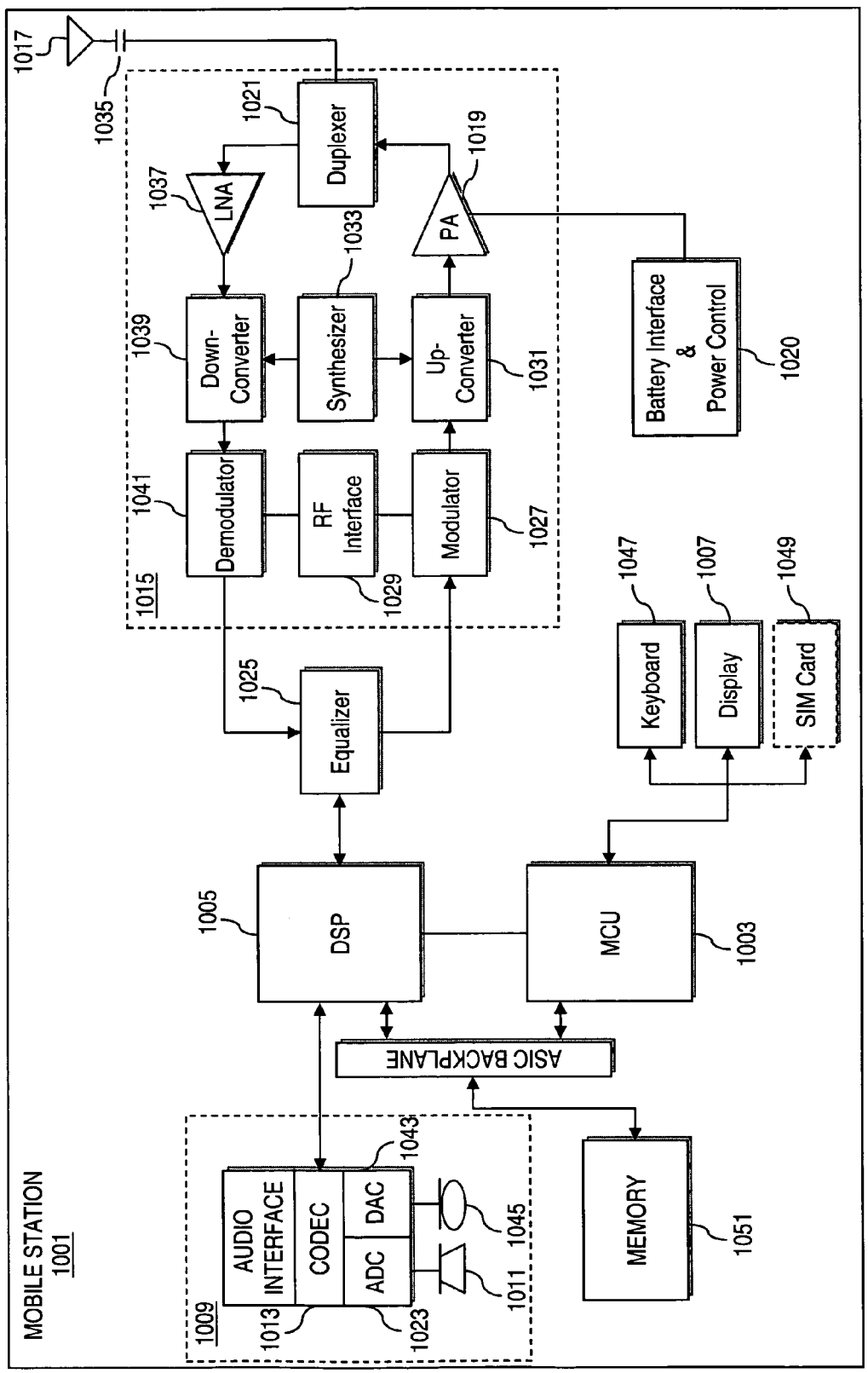
FIG. 10 is a diagram of exemplary components of a mobile station capable of operating in the systems of FIGS. 9A and 9B, according to an embodiment of the invention.

FIG. 10 is a diagram of exemplary components of a mobile station (e.g., handset) capable of operating in the systems of FIGS. 9A and 9B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system (e.g., systems of FIG. 9A or 9B), via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

Figure 11:
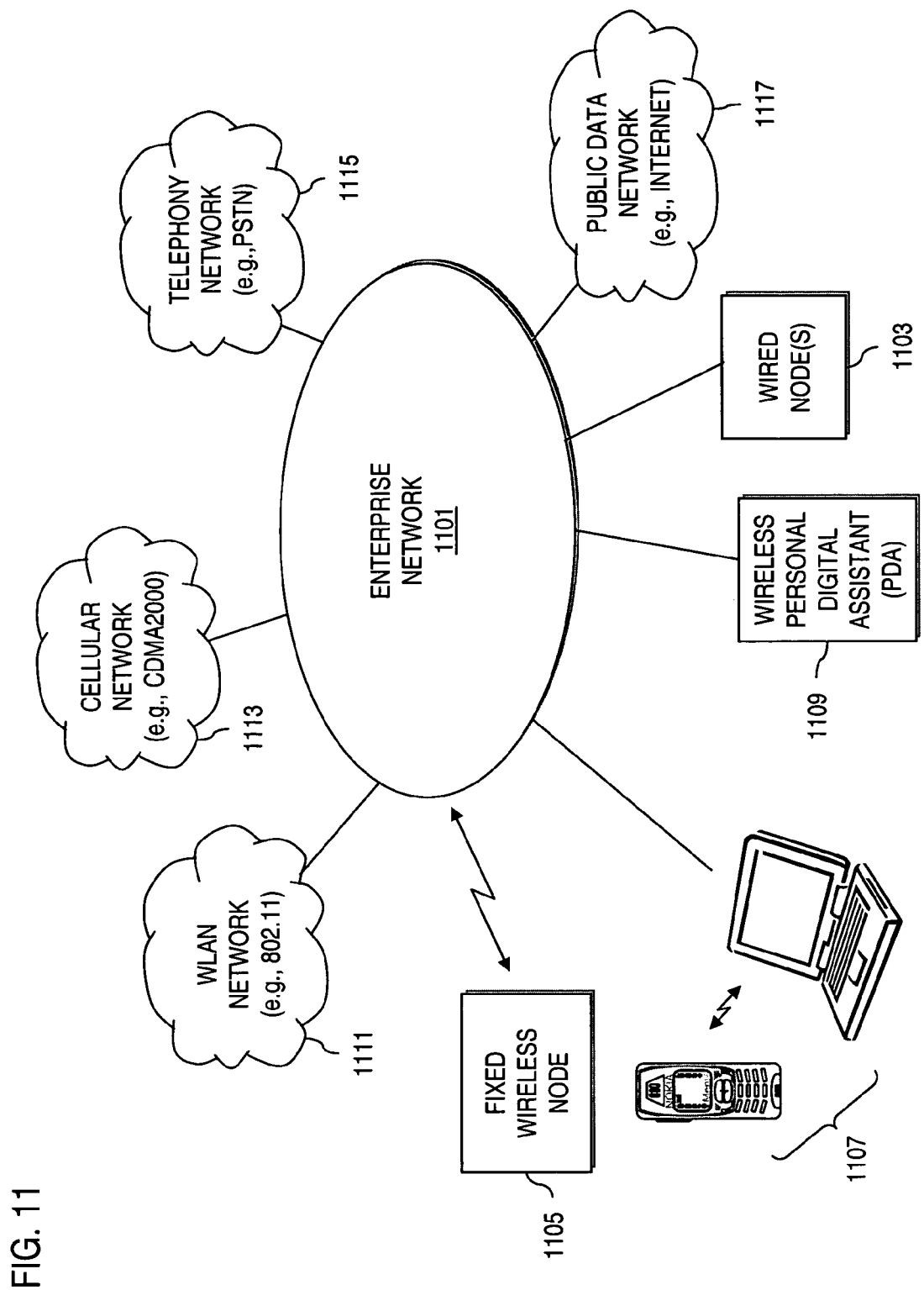
FIG. 11 is a diagram of an enterprise network capable of supporting the processes described herein, according to an embodiment of the invention.

FIG. 11 shows an exemplary enterprise network, which can be any type of data communication network utilizing packet-based and/or cell-based technologies (e.g., Asynchronous Transfer Mode (ATM), Ethernet, IP-based, etc.). The enterprise network 1101 provides connectivity for wired nodes 1103 as well as wireless nodes 1105-1109 (fixed or mobile), which are each configured to perform the processes described above. The enterprise network 1101 can communicate with a variety of other networks, such as a WLAN network 1111 (e.g., IEEE 802.11), a cdma2000 cellular network 1113, a telephony network 1116 (e.g., PSTN), or a public data network 1117 (e.g., Internet).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   setting a threshold relating to loading condition of a communication link; and
   adaptively adjusting the threshold based on an overshoot rate parameter that specifies number of times a target rate is exceeded.

2. A method according to claim 1, wherein the adjusting step is further performed based on number of occurrences of an overshoot event, the overshoot event indicating number of times the target rate is exceed over a predetermined period.

3. A method according to claim 1, further comprising:
   specifying a maximum value that the threshold can be set to;
   specifying a minimum value that the threshold can be set to; and
   selectively modifying the adjusted threshold to be within a range defined by the maximum value and the minimum value.

4. A method according to claim 1, further comprising:
   determining the loading condition of the communication link;
   comparing the determined loading with the threshold; and
   generating a control message for transmission to a terminal, the control message indicating that the loading condition is either high or not high based on the comparison.

5. A method according to claim 1, wherein the threshold specifies a rise over thermal (ROT) ratio.

6. A method according to claim 5, wherein the control message is generated according to a reverse traffic channel medium access control (RTCMAC) protocol, the control message being transmitted to the terminal using spread spectrum.

7. A method according to claim 1, wherein the adjusting step is performed according to a predetermined time interval.

8. An apparatus comprising:
   a processor configured to set a threshold relating to loading condition of a communication link, wherein the processor is further configured to adaptively adjust the threshold based on an overshoot rate parameter that specifies number of times a target rate is exceeded.

9. An apparatus according to claim 8, wherein the processor performs the adjustment based on number of occurrences of an overshoot event, the overshoot event indicating number of times the target rate is exceed over a predetermined period.

10. An apparatus according to claim 8, further comprising:
    a memory configured to store a maximum value that the threshold can be set to, and a minimum value that the threshold can be set to,
    wherein the processor is further configured to selectively modify the adjusted threshold to be within a range defined by the maximum value and the minimum value.

11. An apparatus according to claim 8, wherein the processor is further configured to determine the loading condition of the communication link, to compare the determined loading with the threshold, and to generate a control message for transmission to a terminal, the control message indicating that the loading condition is either high or not high based on the comparison.

12. An apparatus according to claim 8, wherein the threshold specifies a rise over thermal (ROT) ratio.

13. An apparatus according to claim 12, wherein the control message is generated according to a reverse traffic channel medium access control (RTCMAC) protocol, the control message being transmitted to the terminal using spread spectrum.

14. An apparatus according to claim 8, wherein the adjustment of the threshold is performed according to a predetermined time interval.

15. A system comprising the apparatus of claim 8, the system further comprising:
a transceiver configured to transmit a control message to a terminal, the control message indicating whether the loading condition is high or not high based on the adjusted threshold.

16. A method comprising:
receiving a control message indicating that a loading condition of a communication link is either high or not high, wherein the control message is generated by comparing the loading condition with a threshold that is adaptively adjusted based on an overshoot rate parameter that specifies number of times a target rate is exceeded; and
adjusting a transmission rate for communication over the communication link in response to received control message.

17. A method according to claim 16, wherein the threshold adjustment is further performed based on number of occurrences of an overshoot event, the overshoot event indicating number of times the target rate is exceed over a predetermined period.

18. A method according to claim 16, wherein the adjusted threshold is selectively modified to be within a range defined by a maximum value and a minimum value.

19. A method according to claim 16, wherein the threshold specifies a rise over thermal (ROT) ratio.

20. A method according to claim 19, wherein the control message is generated according to a reverse traffic channel medium access control (RTCMAC) protocol, the control message being transmitted from a base station using spread spectrum.

21. A method according to claim 16, wherein the threshold adjustment is performed according to a predetermined time interval.

22. A method according to claim 16, further comprising:
adjusting transmission power in response to the control message.

23. An apparatus comprising:
a processor configured to receive a control message indicating that a loading condition of a communication link is either high or not high, wherein the control message is generated by comparing the loading condition with a threshold that is adaptively adjusted based on an overshoot rate parameter that specifies number of times a target rate is exceeded, the processor being further configured to adjust a transmission rate for communication over the communication link in response to received control message.

24. An apparatus according to claim 23, wherein the threshold adjustment is further performed based on number of occurrences of an overshoot event, the overshoot event indicating number of times the target rate is exceed over a predetermined period.

25. An apparatus according to claim 23, wherein the adjusted threshold is selectively modified to be within a range defined by a maximum value and a minimum value.

26. An apparatus according to claim 23, wherein the threshold specifies a rise over thermal (ROT) ratio.

27. An apparatus according to claim 26, wherein the control message is generated according to a reverse traffic channel medium access control (RTCMAC) protocol, the control message being transmitted from a base station using spread spectrum.

28. An apparatus according to claim 23, wherein the threshold adjustment is performed according to a predetermined time interval.

29. An apparatus according to claim 23, wherein the processor is further configured to adjust transmission power in response to the control message.

30. A system comprising the apparatus of claim 23, the system further comprising:
a keyboard configured to receive input from a user to initiate communications over the communication link;
a display coupled to the keyboard for displaying the input; and
a transceiver configured to transmit a signal over the communication link in response to the input according to the adjusted transmission rate.

31. A method comprising:
setting a rise over thermal (ROT) threshold corresponding to a reverse link of a spread spectrum communication system, wherein the ROT threshold defines a threshold for a ratio of a reverse link receive power to thermal noise level; and
adaptively adjusting the ROT threshold based on an overshoot rate parameter that specifies number of times a target rate is exceeded and based on number of occurrences of an overshoot event, the overshoot event indicating number of times the target rate is exceed over a predetermined period, wherein the adjusted ROT threshold is restricted to a range of values defined by a maximum value and a minimum value.

32. A method according to claim 31, further comprising:
measuring a rise over thermal (ROT) value for the reverse link;
comparing the determined ROT value with the ROT threshold; and
setting a reverse activity bit (RAB) indicating either the ROT value is high or not high based on the comparison, wherein the RAB is transmitted to a terminal for adjustment, by the terminal, of a reverse traffic channel transmission data rate and a traffic-to-pilot channel power ratio.

33. A system comprising:
a processor configured to set a rise over thermal (ROT) threshold corresponding to a reverse link of a spread spectrum communication system, wherein the ROT threshold defines a threshold for a ratio of a reverse link receive power to thermal noise level, the processor being further configured to adaptively adjust the ROT threshold based on an overshoot rate parameter that specifies number of times a target rate is exceeded and based on number of occurrences of an overshoot event, the overshoot event indicating number of times the target rate is exceed over a predetermined period, wherein the adjusted ROT threshold is restricted to a range of values defined by a maximum value and a minimum value.

34. A system according to claim 33, further comprising:
means for measuring a rise over thermal (ROT) value for the reverse link, wherein the processor is further configured to compare the determined ROT value with the ROT threshold, and to set a reverse activity bit (RAB) indicating either the ROT value is high or not high based on the comparison; and means for transmitting the RAB to a terminal for adjustment, by the terminal, of a reverse traffic channel transmission data rate and a traffic-to-pilot channel power ratio.

* * * * *